(12) United States Patent
Bloom et al.

(10) Patent No.: US 6,532,668 B1
(45) Date of Patent: Mar. 18, 2003

(54) CUT SURFACE INJECTION SYSTEM FOR PLANTS

(76) Inventors: Walter L. Bloom, 3131 Slaton Dr., Suite 31, Atlanta, GA (US) 30305; Harry L. Vaughan, 3482 Sweetwater Dr., Lawrenceville, GA (US) 30245

( * ) Notice: Subject to any disclaimer, the term of this patent is extended or adjusted under 35 U.S.C. 154(b) by 0 days.

(21) Appl. No.: 07/462,220

(22) Filed: Jan. 9, 1990

Related U.S. Application Data

(63) Continuation-in-part of application No. 07/093,353, filed on Sep. 4, 1987, which is a continuation-in-part of application No. 06/832,635, filed on Feb. 25, 1986.

(51) Int. Cl.[7] .................................................. B25F 3/00
(52) U.S. Cl. ...................................... 30/123.3; 30/123
(58) Field of Search ............................. 30/123.3, 123, 30/123.4; 47/1.01; 83/169

(56) References Cited

U.S. PATENT DOCUMENTS

| | | | | |
|---|---|---|---|---|
| 2,600,540 A | * | 6/1952 | Johnson ...................... 47/1.01 |
| 2,726,484 A | * | 12/1955 | Simpkins ................ 30/123.3 X |
| 2,789,396 A | * | 4/1957 | Jernander et al. ............. 47/1.01 |
| 2,870,573 A | * | 1/1959 | Scadden ..................... 30/123.3 |
| 4,219,963 A | * | 9/1980 | Mullett ................... 30/123.3 X |

FOREIGN PATENT DOCUMENTS

SU         704529    * 12/1979 ................... 47/1 R

* cited by examiner

*Primary Examiner*—Willmon Fridie, Jr.
(74) *Attorney, Agent, or Firm*—Kilpatrick Stockton LLP

(57) ABSTRACT

A method and apparatus for injecting treatment fluids into the vascular systems of plants through the cut surfaces of plants instantaneously as the plants are being cut, which includes a supply unit for the treatment fluid which is connected to a fluid flow regulator which is turn is connected to a distributor through which the treatment fluid flows onto the cutting elements of a cutting implement thereby keeping the cutting elements continuously coated with a pool of the treatment fluid.

4 Claims, 5 Drawing Sheets

CUT SURFACE INJECTION SYSTEM FOR PLANTS

CROSS-REFERENCE TO RELATED APPLICATIONS

This application is a continuation-in-part of our co-pending application Ser. No. 07/093,353, filed Sep. 4, 1987 which is a continuation-in-part of our earlier application Ser. No. 06/832,635, filed Feb. 25, 1986.

BACKGROUND OF THE INVENTION

This invention relates generally to fluid injection into plants and more particularly to a technique for injecting a fluid into plants and vegetation through the cut portions thereof as the plants or vegetation are being cut.

It is frequently necessary to get fluids into the intravascular fluid distribution system (i.e., xylem and phloem) of plants or vegetation in order for the fluid to affect the plant or vegetation in the desired way. Such fluids commonly include disinfecting solutions, growth regulators, fungicides, insecticides, and herbicides. The use of such fluids are common in the horticultural and landscape industries. Typically, such fluids are applied to the surfaces of the roots and vegetation of the plants by spraying or dousing. One exemplary application is the spraying of road right of ways with growth inhibitor. This application commonly is performed as a separate spraying operation after the right of ways have been cut. By reducing growth rates, it decreases the required frequency of cutting; however, separate spraying operations such as this are both expensive and environmentally hazardous.

Because one essential requirement of most spraying and dousing applications is the entry of the applied fluids into the interior vascular fluid distribution systems of the targeted plants and vegetation, this fluid entry requirement, in turn, often determines required quantities of chemical solutions applied by such methods. The unintended adverse environment impacts of the large quantities of toxic chemicals which are required to satisfy this fluid entry requirement already have resulted in restrictive legislation in some states concerning practices in the horticultural and landscape industries.

SUMMARY OF THE INVENTION

These and other problems and disadvantages associated with the prior art are overcome by the invention disclosed herein by providing a fluid injection technique and apparatus which injects the treatment fluid directly into the vascular system in a plant as an incident of the cutting of the plant's roots, stem or leaves so that the treatment fluid does not have to reach the plant's vascular system by absorption or other transfer mechanisms through the plant's cell walls. The method of the invention includes generating a pool of treatment fluid along the cutting element of a cutting implement; adding treatment fluid to the pool to maintain the pool of treatment fluid on the cutting element; and, while the pool is maintained, cutting the plant with the cutting element so that the cut in the plant is in communication with the pool of treatment fluid at all times during the cutting. Under these conditions, the plant draws treatment fluid at the exact instant of cutting from the pool on the cutting element directly into its vascular system. The sequence of causation for this result is as follows:

1) as the plant is cut, the tension within the fluid which already fills the plant's vascular system is released;

2) this release of tension, in turn, causes the vascular fluid to pull back instantaneously from the cut surface of the plant;

3) treatment fluid on the cutting element which is in contact with the cut surface of the plant is drawn by the receding vascular fluid into the cut ends of the plant's vascular system.

As a consequence, the treatment fluid can migrate directly through the plant's vascular system without having to enter the vascular system through the plant's cell walls. This results not only in a marked saving of the treatment fluid, usually in the order of 85–99%, but also does not get any of the treatment fluid any place other than on the surface of the cut and into the vascular system of the plant. Consequently, the environmental hazards normally associated with spraying are virtually eliminated.

The apparatus of the invention includes a distributor which distributes the treatment fluid on the cutting element of the cutting implement to maintain a thin continuous fluid coating on the cutting element at all times. A solution supply assembly supplies the treatment fluid to the distributor at a controlled rate so that the desired thickness continuous coating is maintained on the cutting element of the cutting implement. The solution supply assembly may supply any of the treatment solutions enumerated above. The supply assembly is typically located above or on top of the cutting implement so that any treatment fluid from the supply assembly will flow under the influence of gravity through the distributor to the cutting element on the cutting implement. A flow regulator means is used to regulate the flow of the treatment fluid from the supply assembly. The supply assembly is removably connected to the distributor for easy replacement when empty while the distributor remains mounted on the cutting implement.

These and other features and advantages of the invention will become more clearly understood upon consideration of the following detailed description and accompanying drawings wherein like characters of reference designate corresponding parts throughout the several views and in which:

Figure 1:
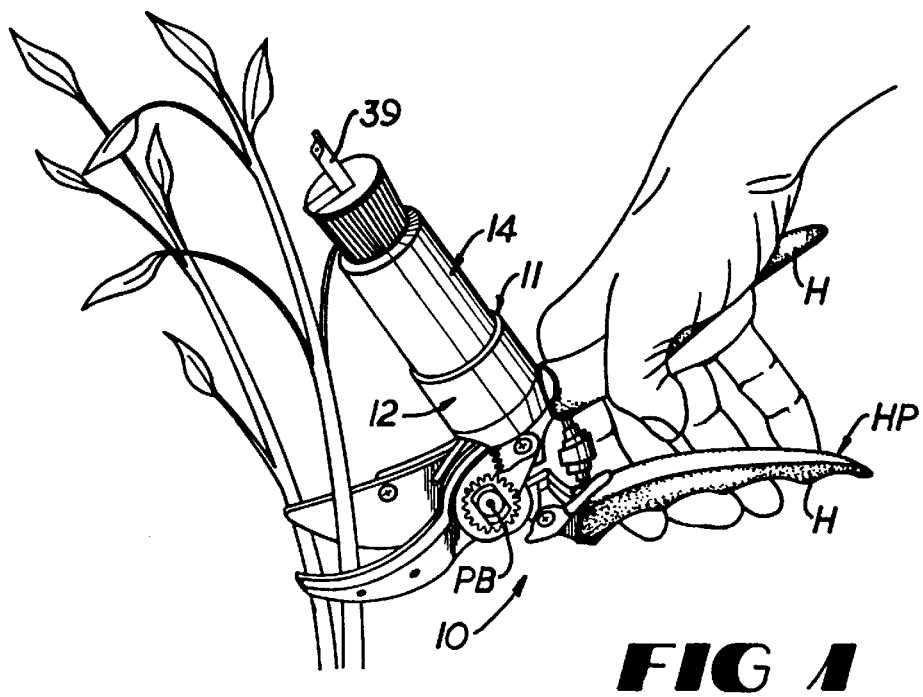
FIG. 1 is a perspective view illustrating the invention in use.
Figure 2:
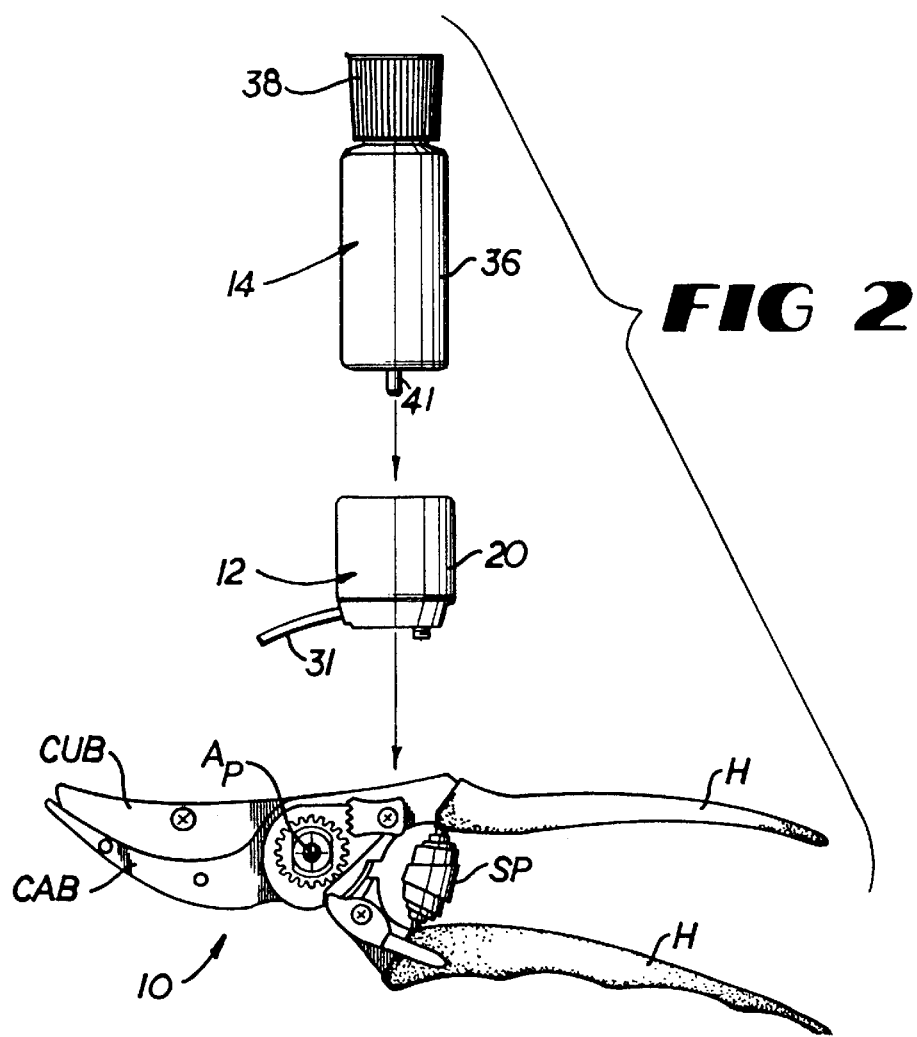
FIG. 2 is an exploded side view of the invention seen in FIG. 1.
Figure 4:
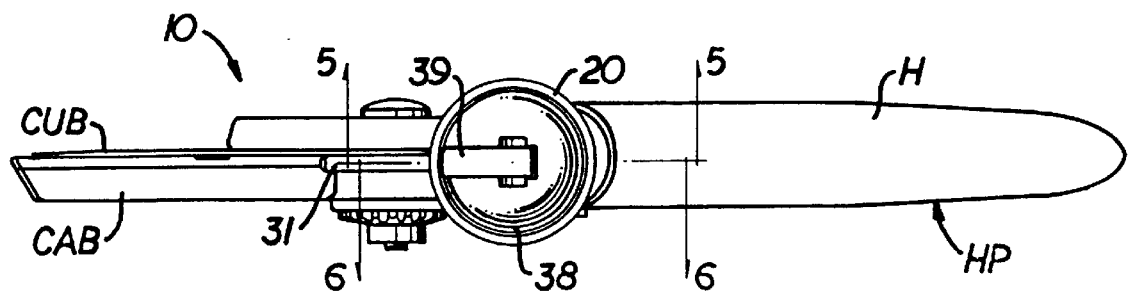
FIG. 4 is a top plan view of the invention.
Figure 3:
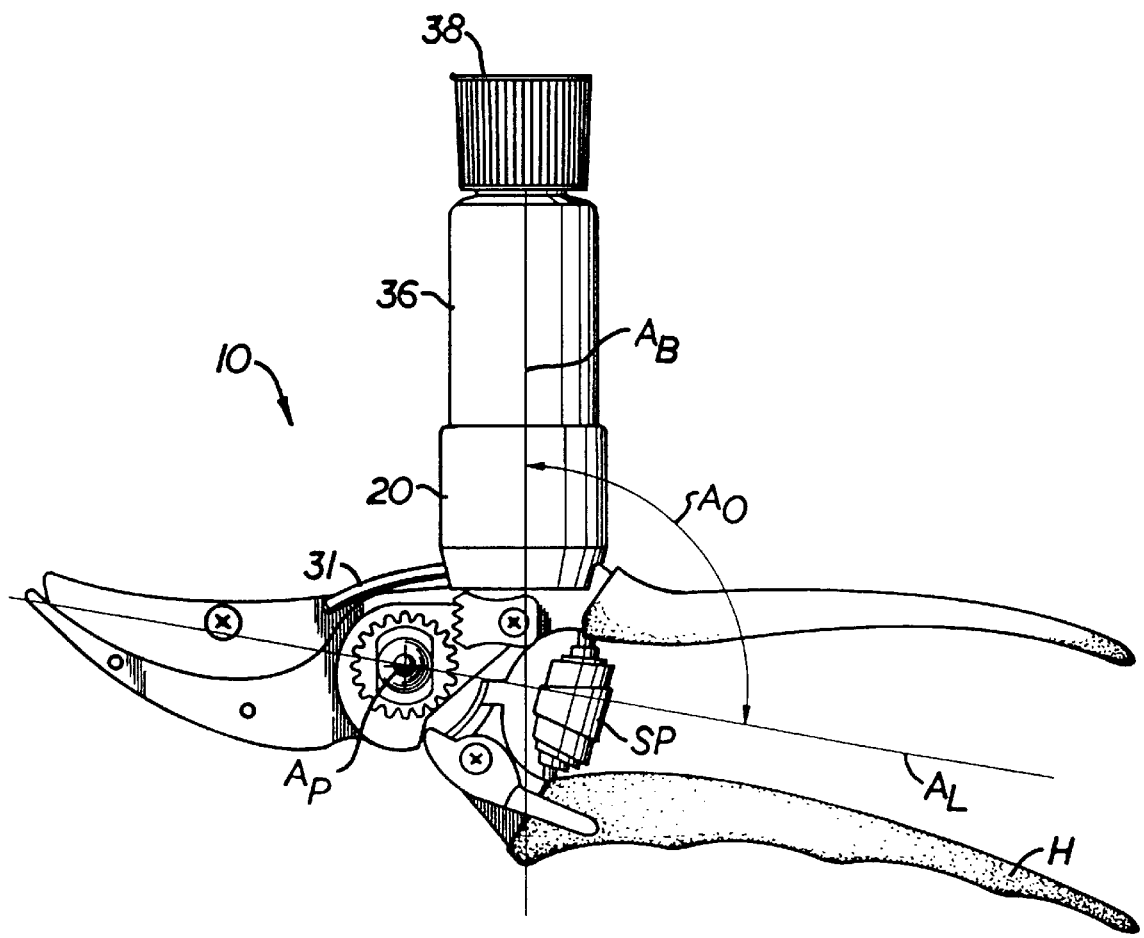
FIG. 3 is a side view of the invention assembled.
Figure 5:
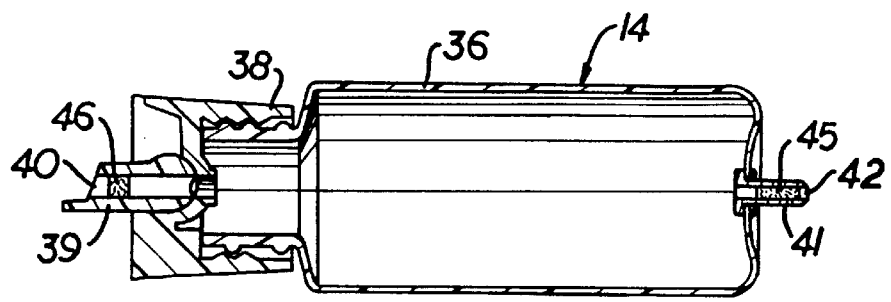
FIG. 5 is an enlarged longitudinal cross-sectional view of the supply assembly taken generally along line 5—5 in FIG. 4.
Figure 6:
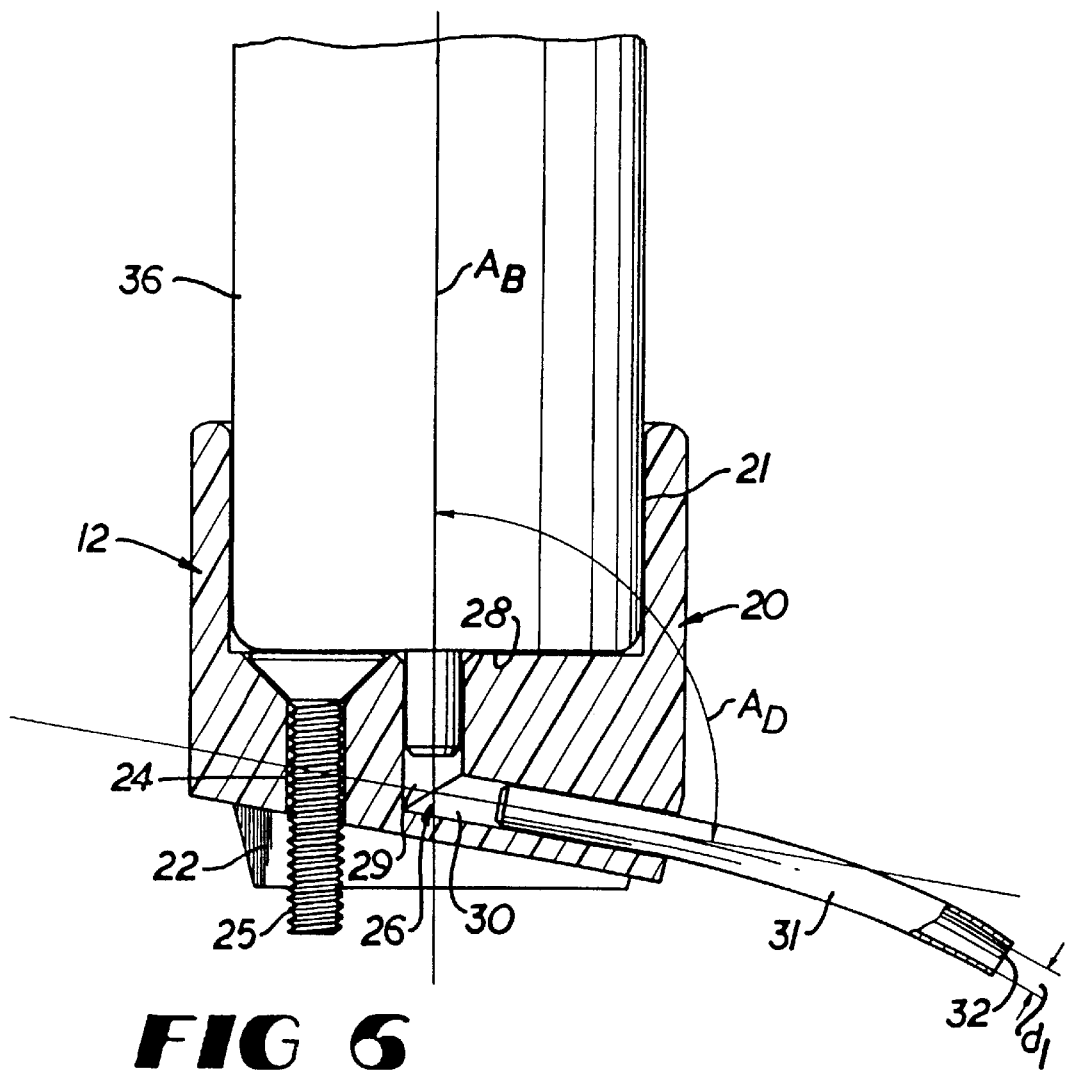
FIG. 6 is an enlarged longitudinal cross-sectional view of the distributor of the invention taken along line 6—6 in FIG. 4.

These figures and the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

The apparatus of the invention is designed for use with any cutting implement used in the pruning or cutting of plants to cause a treatment fluid to be injected directly into the plant vascular system. The apparatus of the invention does this by distributing a layer of treatment fluid onto the cutting element of the cutting implement so that the layer of treatment fluid will cover those portions of the cutting element coming in contact with the plant during the time the plant is being cut. This layer of treatment fluid will remain in contact with the cut in the plant at all times while the cut is being made so that the treatment fluid is inherently drawn directly into the vascular system of the plant by the retraction of the vascular fluid away from the cut at the instant the vascular fluid column is broken.

Referring to the drawings, it will be seen that the first embodiment of the invention is incorporated in a pruning shear assembly 10. The assembly 10 includes a hand pruner HP which mounts thereon a liquid dispensing device 11 to dispense the treatment fluid onto the pruner HP. The hand pruner HP has handles H pivoted together and adapted to be gripped in one of the user's hands and squeezed together. The pruner HP is provided with a concave anvil element CAB and a convex cutting element CUB mounted on the opposed handles H so that the cutting elements CAB and CUB close on each other as they are pivoted on pivot bolt PB about their pivot axis $A_P$ when the handles H are squeezed together. The hand pruners HP are designed to be used with the elements CAB and CUB generally vertically oriented with the concave anvil element CAB generally below the convex cutting elements CUB. The handles H are urged apart by spring SP.

The liquid dispensing device 11 includes a liquid distributor 12 for distributing the liquid onto the elements CAB and CUB and a liquid supply unit 14 removably inserted into the distributor 12 to supply liquid thereto. The liquid supply unit 14 can be replaced when empty or refilled in situ during use as will become more apparent.

The liquid distributor 12 includes a body 20 mounted on the upper handle H (the handle attached to the anvil cutting element CAB) adjacent the pivot bolt PB. The body axis $A_B$ defines an offset angle $A_O$ with respect to the longitudinal axis $A_L$ of the hand pruner HP so that the body axis $A_B$ is generally upright during a majority of normal usage. Angle $A_O$ shown is about 100°. A cylindrical bore 21 is defined in the body 20 and opens upwardly therefrom. The bore 21 is concentric about axis $A_B$ and sized to receive the liquid supply unit 14 therein as will become more apparent. A handle receiving slot 22 is defined across the bottom of the body 20 to receive handle H therein. The slot 22 is appropriately angled to locate body 20 with respect to the axis $A_L$ at angle $A_O$ and is illustrated at about 100°. The body 20 also defines a mounting hole 24 therethrough from bore 21 to slot 22 and offset from axis $A_B$. A screw 25 extends through hole 24 and threadedly engages a like hole in handle H to hold the body 20 in place. A discharge passage 26 extends from the center of the end surface 28 of bore 21 to the outside of the body 20. Passage 26 has an inner section 29 concentric of centerline $A_B$ which joins with an outer section 30 to the outside of the body 20. The outer section 30 is aligned with slot 22 and is oriented at angle $A_D$ with respect to axis $A_B$. A convenient angle $A_D$ is about 100°.

A discharge tube 31 is fixedly mounted in the outer section 30 of passage 26 and projects outwardly therefrom. The projecting end of the tube 31 curves downwardly as will become more apparent.

The liquid supply unit 14 includes a bottle 36 equipped with a screw-on cap 38. The cap 38 is provided with a flip-up spout 39 with a central opening 40 communicating with the interior of bottle 36 when raised. The bottom of bottle 36 has a discharge tube 41 projecting therefrom and defining an opening 42 therethrough. When the bottom of bottle 36 is inserted into the bore 21 in the body 20, the tube 41 projects down into the inner section 29 of passage 26 in body 20. Thus, any liquid flowing out of bottle 36 will flow out passage 26.

To control the flow of liquid out of the bottle 36, a flow regulator plug 45 is inserted in tube 41. When spout 39 is opened, the liquid will flow out of the bottle under the force of gravity with plug 45 regulating the flow rate. While various flow regulator plugs 45 may be used, porous plugs having an open cell pore structure have been found satisfactory. In particular, plastic porous plugs 45 with an open cell, omnidirectional pore structure have been found satisfactory. The particular pore characteristics and size will depend on the liquid being used. For liquids such as alcohol and the like, a plug 45 with a 90–150 micron pore size, a diameter of about 0.125 inch and a void fraction greater than about 35% has been found satisfactory. A good pore size is about 120 microns. This produces a flow rate of about 15–20 drops per minute. The flow rate is selected to insure that a coating of the treatment fluid will be maintained at the cutting edges of the cutting elements.

A check valve may be placed in the spout opening 40 to prevent flow out of cap 38 if the assembly 10 is tipped. Alternatively a porous plug 46 may also be used to limit the liquid flow in that direction. Closing spout 39 serves to stop the liquid flow out of the discharge tube 41. Where the bottle 36 is flexible, liquid can be forced or pumped out of the discharge tube 41 when the spout 39 is closed by pressing on the bottle side walls. With the spout 39 open, the bottle 36 can be inverted and liquid forced out through spout 39 to be applied to larger areas.

It will be understood that different flow control mechanisms may be used in lieu of the porous plug 45. For instance, a needle valve may be used. Also, the flow control mechanism may be located in the liquid distributor 12 rather than in the supply unit 14.

Second Embodiment

Figure 7:
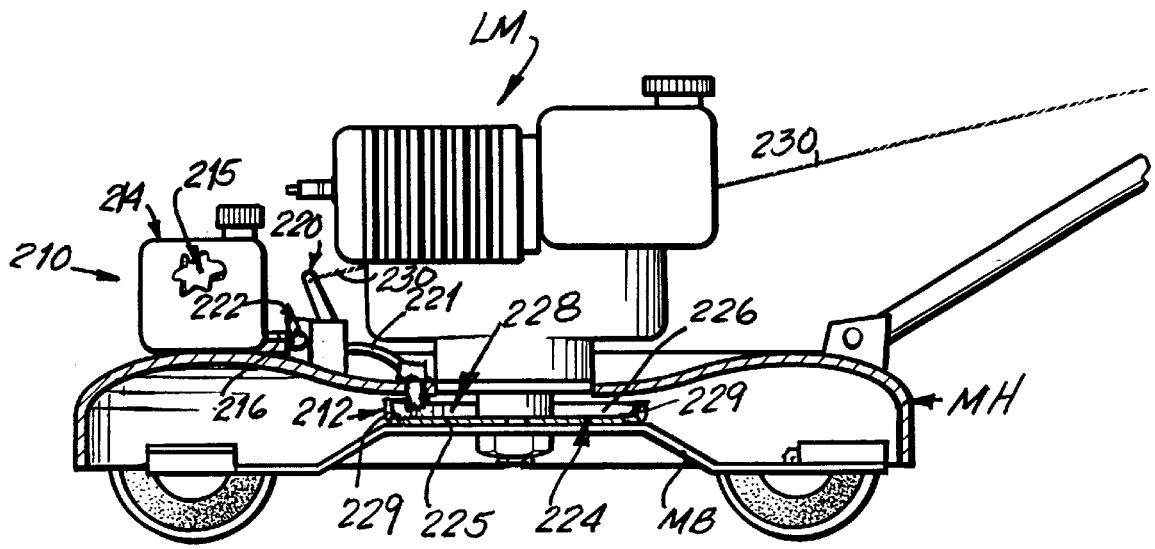
FIG. 7 is a view illustrating the invention incorporated in a lawn mower with the lawn mower housing shown in cross-section.
Figure 8:
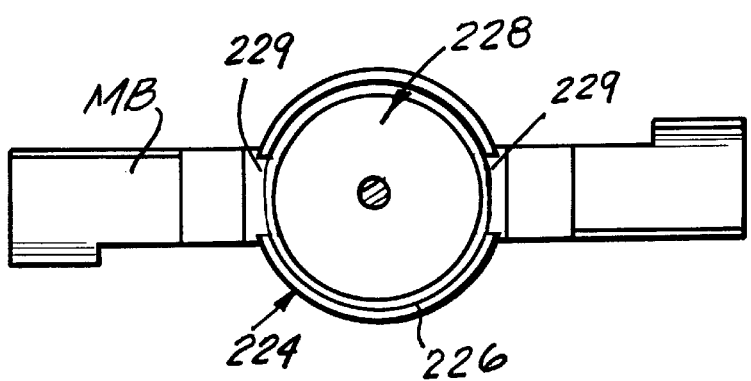
FIG. 8 is an enlarged cross-sectional view taken along line 8—8 in FIG. 7.

FIGS. 7 and 8 illustrate a second embodiment of the invention applied to a lawn mower LM to keep the cutting element coated with a treatment fluid so that plants will inherently intake the treatment fluid directly into their vascular system as the plants are being cut. The second embodiment liquid dispensing assembly 210 has a liquid distributor arrangement 212 which directs the treatment fluid onto the mower cutting element MB and which receives the fluid from liquid supply unit 214.

The supply unit 214 is mounted on housing MH of the mower LM and defines a closed liquid chamber 215 therein filled with the treatment fluid. A discharge tube 216 connects the chamber 215 with the liquid distributor arrangement 212. The chamber 215 is vented so that the treatment liquid can freely flow out of tube 216 into distributor arrangement 212.

The liquid distributor arrangement includes a flow control switch 220 and flow regulator 222 in series located on the housing MH. A dispensing tube 221 extends from the switch 220 and regulator 222 down inside the housing to a position above dispersion control unit 224 mounted on and rotating with the mower cutting element MB.

The dispersion control unit 224 includes a circular base plate 225 joined with an upstanding retaining lip 226 around its periphery to form an upwardly opening fluid retaining recess 228 therein. The lip 226 defines a cutout 229 over each of the positions where the cutting element MB passes out from under the unit 224 so that any treatment liquid in the recess flows out of the cutouts 229 and onto the cutting element MB. The treatment fluid passing out of the cutouts 229 flows onto cutting element MB and flows therealong under centrifugal force to coat same.

The flow regulator 222 is adjusted to keep the cutting portion of cutting element MB coated with fluid. The flow control switch 220 is connected to the mower throttle control (not shown) via control cable 230 to permit flow when the throttle is opened and to stop flow when the throttle is closed to idle.

Fluid flowing out of the dispensing tube 221 under the influence of gravity falls into the upwardly opening recess 228 in the dispersion control unit 224 and is forced out to the lip 226 by centrifugal force. The treatment fluid then passes out of the cutouts 229 onto the cutting element MB to coat same.

Third Embodiment

Figure 9:
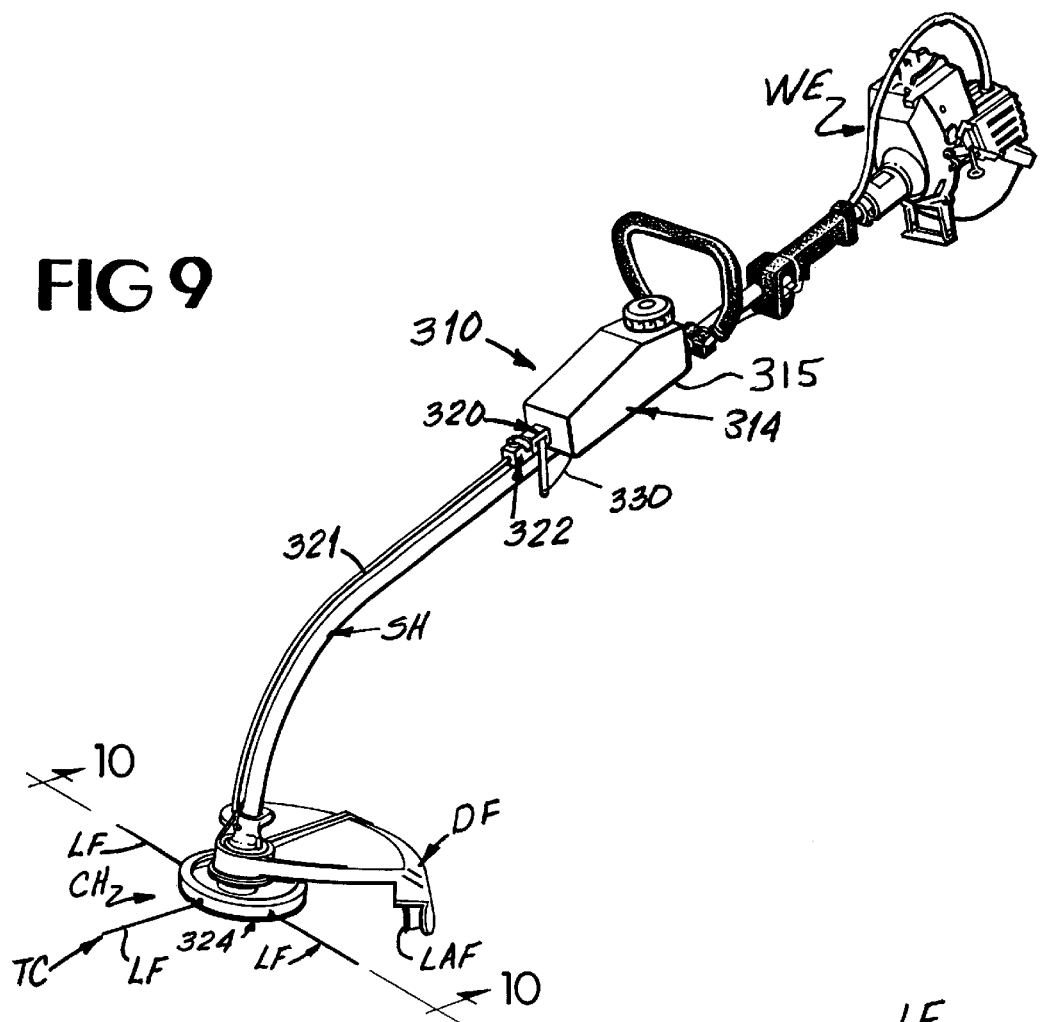
FIG. 9 is a perspective view illustrating the invention installed on a cutting implement with a flexible cutting element.
Figures 10, 11:
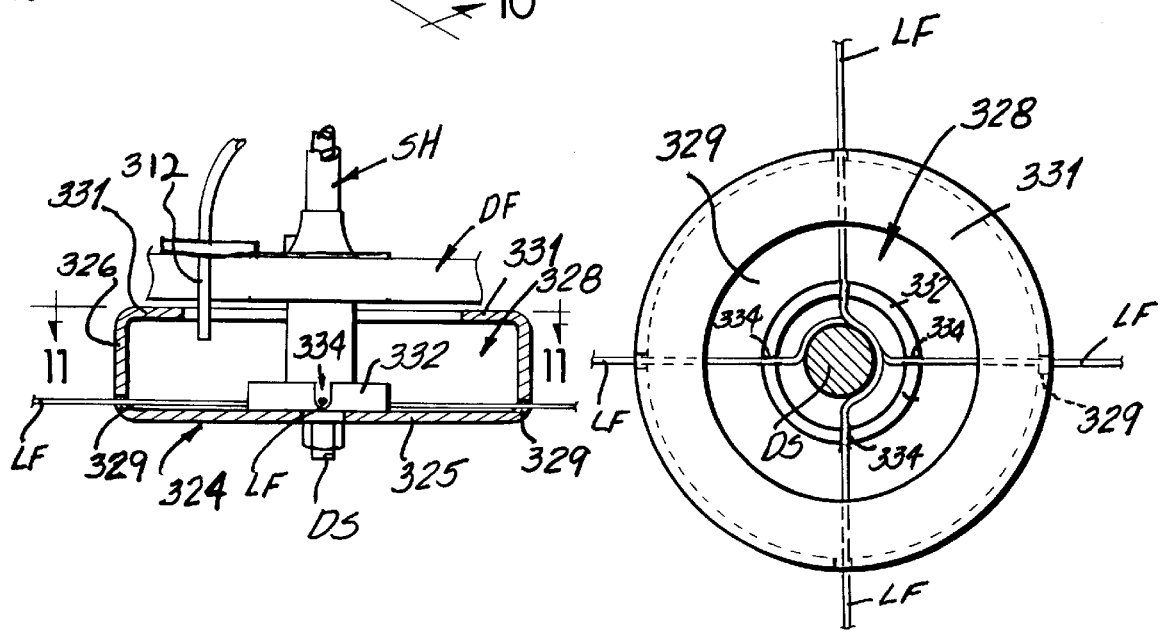
FIG. 10 is an enlarged cross-sectional view taken along line 10—10 in FIG. 9.
FIG. 11 is an enlarged cross-sectional view taken along line 11—11 in FIG. 10.

FIGS. 9–11 illustrate a third embodiment of the invention applied to a cutting implement WE equipped with a flexible cutting element TC. Cutting implements WE are conventionally available.

The liquid dispensing assembly 310 includes a liquid distributor arrangement 312 to distribute the treatment liquid received from a liquid supply unit 314. The liquid supply unit 314 is mounted on the support housing SH of the implement WE as best seen in FIG. 9 and defines a closed liquid chamber 315 therein which contains the treatment liquid.

The treatment fluid is discharged from the closed chamber 315 through a flow control switch 320 connected in series with a flow regulator 322. A dispensing tube 321 discharges the output from the switch 320 and flow regulator 322. The dispensing tube 321 extends along the housing SH and is supported on the deflector DF adjacent the cutting head CH. The flow control switch 320 is controlled by a control cable 330 operatively associated with the throttle control on the implement WE.

A dispersion control unit 324 is incorporated in the cutting head CH. The dispersion control unit 324 includes a generally cylindrical base plate 325 with an integral upstanding retaining lip 326 extending therearound. An inwardly turned confinement lip 331 is integral with the upstanding open top of the retaining lip 326 to retain liquid dropping from the dispensing tube 321 into the open top recess 328 defined in the dispersion control unit 324. The dispersion control unit 324 is mounted on the drive shaft DS of the implement WE so that the recess 328 faces upwardly when the implement WE is in operation. The upstanding retaining lip 326 defines a plurality of circumferentially spaced holes 329 equally spaced around the periphery of the lip 326. The number of holes 329 may be varied although four holes 329 are illustrated. The dispersion control unit 324 also defines an upstanding annular retaining flange 332 on the base plate 325 projecting up into the recess 328 and provided with appropriate notches 334 in alignment with the holes 329.

The flexible cutting element TC includes a plurality of line filaments LF. A line filament LF is threaded through one of the holes 329 on one side of the unit 324 and then out through the opposing hole 329 on the opposite side of the unit 324. To hold the line filament LF in position, the central portion of the line filament LF is placed in the notches 334 in registration with the holes 329 through which the filament line passes and the line filament is pulled taut to lock the filament LF in the control unit 324. Another line filament LF is inserted similarly. Usually, the line filaments LF are cut to the appropriate length to pass under the deflector DF although an appropriate length adjusting knife LAF is provided on the deflector DF to automatically cut the line filaments LF to length as they pass thereby.

The implement WE works similar to the other implements in that the treatment liquid flows out of the dispensing tube 321 down into the recess 328. The holes 329 are larger in diameter than the line filament LF so that the liquid can flow out the line filament toward the projecting end thereof and cover the line filaments LF with a layer of treatment fluid. This causes the plant to automatically suck the treatment liquid into the vascular system as an incident of the cutting of the plant.

Operation

The embodiments of the invention operate similarly. The treatment fluid coating is maintained along the cutting elements as the plant cut is being made. This keeps the treatment fluid in contact with the cut being made in the plant at all times during the cutting operation. By keeping the treatment fluid in direct contact with the cut surface of the plant as the cut is being made, and hence with the vascular fluid already in the plant, the treatment fluid is drawn inherently into the plant's vascular system.

What is claimed as invention is:

1. A method of introducing a treatment fluid into the internal vascular liquid distribution system of a plant through a cut surface on the plant made with a cutting blade on a cutting implement comprising the steps of:

- a) substantially continuously maintaining a layer of the treatment fluid on a prescribed portion of the cutting blade of the cutting implement to be used to cut the plant comprising the substeps of:
  - a1) maintaining a reservoir of treatment fluid at a higher elevation than the cutting blade,
  - a2) providing a fluid passage from the reservoir to the cutting blade so that the treatment fluid flows from the reservoir to the cutting blade under the influence of gravity, and
  - a3) regulating the flow of treatment fluid onto the cutting blade so as to continuously maintain a layer of the treatment fluid on the prescribed portion of the cutting blade of the cutting implement to be used to cut the plant; and
- b) while the layer of treatment fluid is substantially continuously maintained, cutting the plant with the cutting blade so that the cut surface of the plant is always located in the layer of treatment fluid as the cut in the plant is being made whereby the cut through the plant into the plant vascular system is always submerged in the layer of treatment fluid to cause the retraction of the intravascular fluid in the plant vascular system away from the cut to draw the treatment fluid into the plant vascular system without exposing air to the cut in the plant while it is being made.

2. A method of introducing a treatment fluid into the internal vascular liquid distribution system of a plant through a cut surface on the plant made with the cutting element on a plant pruning shear comprising the step of:

substantially continuously maintaining a layer of the treatment fluid on the cutting element of the pruning shear while the cutting element is cutting into the plant so that the cut surface of the plant is always submerged in the layer of treatment fluid as the cut is being made to cause the retraction of the intravascular fluid in the plant vascular system away from the cut to draw the treatment fluid into the plant vascular system without the introduction of any significant amounts of air into the plant vascular system comprising the substeps of:
  a) maintaining a reservoir of treatment fluid on the pruning shears at a higher elevation than the cutting element;
  b) providing a fluid passage from the reservoir to the cutting element so that the treatment fluid flows from the reservoir onto the surface of the cutting element under the influence of gravity; and
  c) regulating the flow of treatment fluid onto the cutting element so as to continuously maintain the layer of the treatment fluid on the prescribed portion of the cutting element coming in contact with the cut in the plant while the cut is being made.

3. A method of introducing a treatment fluid into the internal vascular liquid distribution system of plants through a cut surface on the plants made with the mower cutting element rotatably mounted about its center in the housing on a rotary mower comprising the step of:

substantially continuously maintaining a layer of the treatment fluid on the mower cutting element of the mower as the mower moves over the plants and while the cutting element is cutting into the plants so that the cut surfaces of the plants are always submerged in the layer of treatment fluid as the cuts are being made to cause the retraction of the intravascular fluid in the plant vascular systems away from the cuts to draw the treatment fluid into the plant vascular systems without the introduction of any significant amounts of air into the vascular systems of the plants comprising the substeps of:
  a) maintaining a reservoir of treatment fluid on the mower above the mower housing and at a higher elevation than the mower cutting element;
  b) providing a fluid passage from the reservoir through the mower housing to the central portion of the rotary mower cutting element so that the treatment fluid flows from the reservoir onto the central portion of the cutting element under the influence of gravity to be forced outwardly along the cutting element in the layer as the cutting element rotates; and
  c) regulating the flow of treatment fluid onto the cutting element so as to continuously maintain the layer of the treatment fluid on the prescribed portions of the cutting element coming in contact with the cuts in the plants while the cuts are being made.

4. The method of claim 3 wherein substep c) further includes allowing the treatment fluid to flow onto the cutting element only while the cutting element is rotating.

* * * * *